(12) United States Patent
Shi

(10) Patent No.: US 10,788,873 B2
(45) Date of Patent: Sep. 29, 2020

(54) POWER CONTROL CIRCUIT

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventor: Qiu-Yun Shi, Wuhan (CN)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 75 days.

(21) Appl. No.: 16/186,235

(22) Filed: Nov. 9, 2018

(65) Prior Publication Data
US 2019/0243433 A1    Aug. 8, 2019

(30) Foreign Application Priority Data
Feb. 7, 2018   (CN) .......................... 2018 1 0122675

(51) Int. Cl.
*G06F 1/26*   (2006.01)
(52) U.S. Cl.
CPC .................... *G06F 1/263* (2013.01)

(58) Field of Classification Search
CPC ...................................................... G06F 1/263
See application file for complete search history.

(56) References Cited

U.S. PATENT DOCUMENTS

| | | | |
|---|---|---|---|
| 9,766,675 B2 * | 9/2017 | Uan-zo-li | G06F 1/266 |
| 10,173,535 B2 * | 1/2019 | Chong | H02J 9/06 |
| 2012/0293899 A1 * | 11/2012 | Hou | H02H 3/243 361/86 |
| 2012/0306435 A1 * | 12/2012 | Tu | H02J 7/0072 320/107 |
| 2013/0313914 A1 * | 11/2013 | Hou | G06F 1/266 307/115 |

* cited by examiner

*Primary Examiner* — Stefan Stoynov
(74) *Attorney, Agent, or Firm* — ScienBiziP, P.C.

(57) ABSTRACT

A power control circuit includes a first power supply circuit configured to supply power to a universal serial bus upon a motherboard is turned on. When the motherboard is turned on, a first power source outputs a first voltage to a first input terminal of a double diode of the first power supply circuit, a second power source outputs a second voltage to a second input terminal of the double diode, an output terminal of the double diode outputs a first voltage, the first voltage controls the first electronic switch to switch on, and a third power supply outputs a second voltage through a first electronic switch of the first power supply circuit to provide power to the universal serial bus.

10 Claims, 2 Drawing Sheets

POWER CONTROL CIRCUIT

FIELD

The subject matter herein generally relates to a power supply circuit of a motherboard for controlling power supply to a universal serial bus.

BACKGROUND

When a motherboard is started up from an off state, if a startup voltage is too low, a USB of the motherboard may be damaged.

BRIEF DESCRIPTION OF THE DRAWINGS

Implementations of the present disclosure will now be described, by way of example only, with reference to the attached figures.

DETAILED DESCRIPTION

Figure 1:
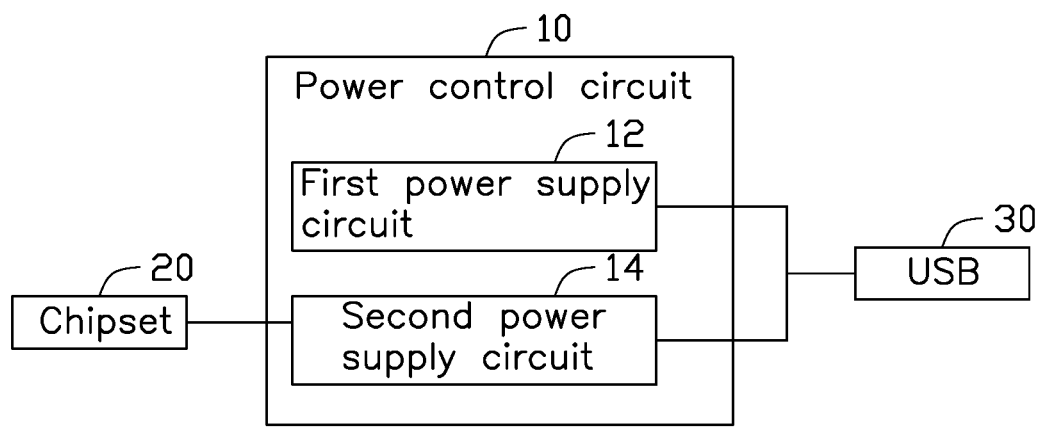
FIG. 1 is a block diagram of a power control circuit in accordance with an embodiment of the present disclosure.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

FIG. 1 shows a power control circuit 10 implemented in a motherboard (not shown). The power control circuit 10 is electrically coupled to a chipset 20.

The chipset 20 outputs a first power supply signal and a second power supply signal. The power control circuit 10 outputs a power supply voltage to a universal serial bus (USB) 30.

The power control circuit 10 includes a first power supply circuit 12. The first power supply circuit 12 outputs the power supply voltage to the USB 30 when the motherboard is turned on.

The power control circuit 10 further includes a second power supply circuit 14. The second power supply circuit 14 outputs the power supply voltage to the USB 30 when the motherboard is in a sleep mode.

Figure 2:
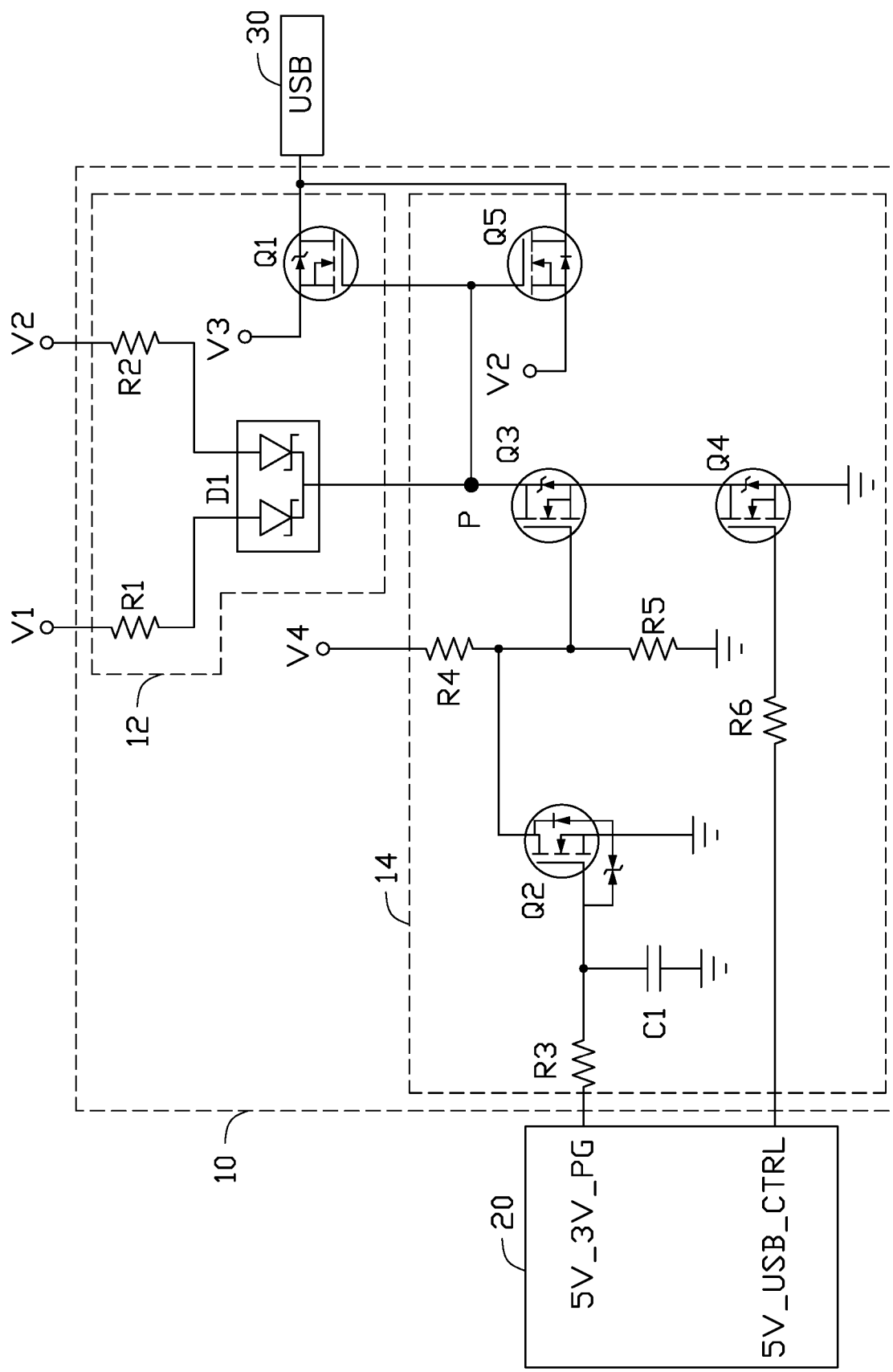
FIG. 2 is a circuit diagram of the power control circuit in FIG. 1.

FIG. 2 shows the first power supply circuit 12 including a double diode D1, a first electronic switch Q1, a first resistor R1, and a second resistor R2.

A first input terminal of the double diode D1 is coupled through the first resistor R1 to a first power supply V1. A second input terminal of the double diode D1 is coupled through the second resistor R2 to a second power supply V2. An output terminal of the double diode D1 is coupled to a first terminal of the first electronic switch Q1. A second terminal of the first electronic switch Q1 is coupled to a third power supply V3. A third terminal of the first electronic switch Q1 outputs the power supply voltage to the USB 30.

The chipset 20 includes a first signal output pin 5V_3V_PG and a second signal output pin 5V_USB_CTRL.

The second power supply circuit 14 includes a second through fourth electronic switch Q2-Q4, a third through sixth resistor R3-R6, and a first capacitor C1.

A first terminal of the second electronic switch Q2 is coupled through the third resistor R3 to the first signal output pin 5V_3V_PG of the chipset 20. The first terminal of the second electronic switch Q2 is further coupled to ground through the first capacitor C1. A second terminal of the second electronic switch Q2 is coupled to ground. A third terminal of the second electronic switch Q2 is coupled to a fourth power supply V4 through the fourth resistor R4. The third terminal of the second electronic switch Q2 is further coupled to a first terminal of the third electronic switch Q3. The first terminal of the third electronic switch Q3 is further coupled to ground through the fifth resistor R5. A second terminal of the third electronic switch Q3 is coupled to a third terminal of the fourth electronic switch Q4. The third terminal of the third electronic switch Q3 is further coupled to the output terminal of the double diode D1. A first terminal of the fourth electronic switch Q4 is coupled to the second signal output pin 5V_USB_CTRL of the chipset 20 through the sixth resistor R6.

The second power supply circuit 14 further includes a fifth electronic switch Q5. A first terminal of the fifth electronic switch Q5 is coupled to the first terminal of the first electronic switch Q1. The first terminal of the fifth electronic switch Q5 is further coupled to a public endpoint P of the output terminal of the double diode D1 and the third terminal of the third electronic switch Q3. A second terminal of the fifth electronic switch Q5 is coupled to the second power supply V2. A third terminal of the fifth electronic switch Q5 outputs the power supply voltage to the USB 30.

In at least one embodiment, when the motherboard is turned on, the first power supply V1 outputs a 12V voltage, and the third voltage V3 simultaneously outputs a 5V voltage through a power converter circuit (not shown). When the motherboard is turned on, voltages of the second power supply V2 and the fourth power supply V4 are 5V.

In at least one embodiment, each of the first through fourth electronic switches Q1-Q4 is an n-type field-effect transistor. The first terminal of each of the first through fourth electronic switches Q1-Q4 is a gate electrode of the n-channel field-effect transistor. The second terminal of each of the first through fourth electronic switches Q1-Q4 is a source electronic of the n-channel field-effect transistor. The third terminal of each of the first through fourth electronic switches Q1-Q4 is a drain electrode of the n-channel field-effect transistor.

In at least one embodiment, the fifth electronic switch Q5 is a p-channel field-effect transistor. The first terminal of the fifth electronic switch Q5 is a gate electrode of the p-channel field-effect transistor. The second terminal of the fifth electronic switch Q5 is a source electrode of the p-channel field-effect transistor. The third terminal of the fifth electronic switch Q5 is a drain electrode of the p-channel field-effect transistor.

When the motherboard is turned on, the first signal output pin 5V_3V_PG and the second signal output pin 5V_USB_CTRL of the chipset 20 output the first power supply signal and the second power supply signal, respectively, at a high level voltage. When the motherboard is in the sleep mode, the first signal output pin 5V_3V_PG and the second signal output pin 5V_USB_CTRL of the chipset 20 output the first power supply signal and the second power supply signal, respectively, at a low level voltage.

In use, when the motherboard is switched from the sleep mode to the turn-on mode, the first signal output pin 5V_3V_PG and the second signal output pin 5V_USB_CTRL of the chipset 20 output the first power supply signal and the second power supply signal, respectively, at the high level voltage to the second electronic switch Q2 and the fourth electronic switch Q4, thereby switching on the second electronic switch Q2 and the fourth electronic switch Q4, and switching off the third electronic switch Q3. Simultaneously, the first power supply V1 begins to output the 12V voltage and the second power supply V2 outputs the 5V voltage, thereby switching on the double diode D1, switching off the fifth electronic switch Q5, and completely switching on the first electronic switch Q1. Thus, the third power supply V3 outputs the 5V voltage through the first electronic switch Q1 to the USB 30.

When the motherboard is switched from the turn-on mode to the sleep mode, the first power supply V1 does not output the 12V voltage, the third power supply V3 does not output the 5V voltage, and the second power supply V2 continues to output the 5V voltage. Simultaneously, when the motherboard is switched from the turn-on mode to the sleep mode, the first signal output pin 5V_3V_PG and the second signal output pin 5V_USB_CTRL of the chipset 20 output the first power supply signal at a low level voltage to switch Q3, and causing the public endpoint P to be at a low level voltage. Thus, the output terminal of the double diode D1 is disconnected from the third terminal of the third electronic switch Q3. Simultaneously, the public endpoint P having the low level voltage causes the fifth electronic switch Q5 to be completely switched on and the first electronic switch Q1 to be switched off. Thus, the second power supply V2 is output through the fifth electronic switch Q5 at 5V to the USB 30.

When the motherboard is switched from an off state to the on state, the first power supply circuit 12 controls the first electronic switch Q1 to be completely switched on, so that the third power supply V3 outputs the power supply voltage through the first electronic switch Q1. When the motherboard is switched from the turn-on mode to the sleep mode, the second power supply circuit 14 controls the fifth electronic switch Q5 to be completely switched on, so that the second power supply V2 outputs the power supply voltage through the fifth electronic switch Q5.

The power control circuit 10 described above and the motherboard using the power control circuit 10 uses the first power supply circuit 12 and the second power supply circuit 14 to control the first electronic switch Q1 and the fifth electronic switch Q5 to be completely switched on, respectively. In this way, the USB 30 is protected from a low voltage output of a power source.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A power control circuit comprising:
a first power supply circuit configured to supply power to a universal serial bus upon turning on of a motherboard, the first power supply comprising a double diode and a first electronic switch; wherein:
a first input terminal of the double diode is coupled to a first power supply through a first resistor, and a second input terminal of the double diode is coupled to a second power supply through a second resistor;
an output terminal of the double diode is coupled to a first terminal of the first electronic switch;
a second terminal of the first electronic switch is coupled to a third power supply;
a third terminal of the first electronic switch is coupled to the universal serial bus;
when the motherboard is turned on, the first power supply outputs a first voltage to the first input terminal of the double diode, the second power supply outputs a second voltage to the second input terminal of the double diode, the output terminal of the double diode outputs the first voltage, the first voltage controls the first electronic switch to switch on, and the third power supply outputs the second voltage through the first electronic switch to provide power to the universal serial bus.

2. The power control circuit of claim 1, further comprising second power supply circuit configured to provide power to the universal serial bus when the motherboard is in a sleep mode; the second power supply circuit is coupled to a chipset installed on the motherboard.

3. The power control circuit of claim 2, wherein:
the chipset comprises a first signal output pin and a second signal output pin;
when the motherboard is in the sleep mode, the first signal output pin outputs a first power supply signal at a low voltage level, and the second signal output pin outputs a second power supply signal at a high voltage level;
the second power supply circuit comprises a second electronic switch, a third electronic switch, and a fourth electronic switch;
a first terminal of the second electronic switch is coupled through a third resistor to a first signal output pin of the chipset; the first terminal of the second electronic switch is further coupled to ground through a first capacitor; a second terminal of the second electronic switch is coupled to ground; a third terminal of the second electronic switch is coupled through a fourth resistor to a fourth power supply; the third terminal of the second electronic switch is further coupled to a first terminal of the third electronic switch; the first terminal of the third electronic switch is further coupled through a fifth resistor to ground; a second terminal of the third electronic switch is coupled to a third terminal of the fourth electronic switch; the third terminal of the third electronic switch is coupled to the output terminal of the double diode; a first terminal of the fourth electronic switch is coupled through a sixth resistor to the second signal output pin of the chipset.

4. The power control circuit of claim 3, wherein:
the second power supply circuit further comprises a fifth electronic switch;

a first terminal of the fifth electronic switch is coupled to the first terminal of the first electronic switch; the first terminal of the fifth electronic switch is further coupled to a public endpoint of the output terminal of the double diode and the third terminal of the third electronic switch;

a second terminal of the fifth electronic switch is coupled to the second power supply;

a third terminal of the fifth electronic switch is coupled to the universal serial bus;

the fourth power supply outputs the second voltage when the motherboard is in the sleep mode.

5. The power control circuit of claim 4, wherein:

when the motherboard begins to be in the sleep mode, the first signal output pin of the chipset outputs the first power supply signal at the low level voltage to the second electronic switch, and the second signal output pin of the chipset outputs the second power supply signal at the high level voltage to the fourth electronic switch, thereby controlling the second electronic switch to switch off and the fourth electronic switch to switch on;

the third electronic switch is switched on after the second electronic switch is switched off; the public endpoint is at a low level voltage to cause the output terminal of the double diode to be disconnected from the third terminal of the third electronic switch, and the fifth electronic switch is switched on;

the second power supply outputs the second voltage through the fifth electronic switch to provide power for the universal serial bus.

6. The power control circuit of claim 5, wherein the first voltage is 12V, and the second voltage is 5V.

7. The power control circuit of claim 5, wherein the first through fifth electronic switches are each n-channel field-effect transistors.

8. The power control circuit of claim 7, wherein the first terminal of each of the first through fourth electronic switches is a gate electrode of the n-channel field-effect transistor; the second terminal of each of the first through fourth electronic switches is a source electronic of the n-channel field-effect transistor; the third terminal of each of the first through fourth electronic switches is a drain electrode of the n-channel field-effect transistor.

9. The power control circuit of claim 8, wherein the fifth electronic switch is a p-channel field-effect transistor.

10. The power control circuit of claim 9, wherein the first terminal of the fifth electronic switch is a gate electrode of the p-channel field-effect transistor; the second terminal of the fifth electronic switch is a source electrode of the p-channel field-effect transistor; the third terminal of the fifth electronic switch is a drain electrode of the p-channel field-effect transistor.

* * * * *